United States Patent [19]

Yang

[11] Patent Number: 5,404,966

[45] Date of Patent: Apr. 11, 1995

[54] LUBRICATION APPARATUS

[75] Inventor: Yun J. Yang, Puchon City, Rep. of Korea

[73] Assignee: Korea Lube-Tech Ltd., Seoul, Rep. of Korea

[21] Appl. No.: 44,608

[22] Filed: Apr. 9, 1993

[30] Foreign Application Priority Data

Dec. 1, 1992 [KR] Rep. of Korea ............ 92-24075

[51] Int. Cl.$^6$ ................................................ F16N 5/00
[52] U.S. Cl. ................................ 184/39; 184/108; 222/389
[58] Field of Search ............ 184/29, 39, 47, 6.4, 184/108; 222/389

[56] References Cited

U.S. PATENT DOCUMENTS

| | | | |
|---|---|---|---|
| 2,852,098 | 9/1958 | Benson | 184/39 |
| 3,367,545 | 2/1968 | Cook | 222/389 |
| 3,842,939 | 10/1974 | Satzinger | 222/389 |
| 4,023,468 | 5/1977 | Poirier | 92/13.2 |
| 4,023,469 | 5/1977 | Miller | 92/86.5 |
| 4,023,648 | 5/1977 | Orlitzky et al. | 184/39 |
| 4,671,386 | 6/1987 | Oritzky | 184/39 |
| 4,744,442 | 5/1988 | Bras et al. | 184/39 |
| 5,012,897 | 5/1991 | Jorissen | 184/39 |

OTHER PUBLICATIONS

*Encyclopedia of Plastics* p. 370 dated Dec. 1989.

*Primary Examiner*—Thomas E. Denion
*Attorney, Agent, or Firm*—Foley & Lardner

[57] ABSTRACT

The present invention is related to a lubricating apparatus comprising a container filled with lubricant, a slidable piston fitted within the safety means, a frame welded onto the container, a gas generating means fixed onto the frame, an lubricant outlet and an electronic circuit. When the piston is at the top dead center, the space defined between the bottom of the gas generating member and the upper side of the piston is substantially small compared to the rate of gas generation so that prompt initiation of lubrication is possible.

5 Claims, 4 Drawing Sheets

LUBRICATION APPARATUS

FIELD OF THE INVENTION

The present invention relates to a lubricating apparatus which can supply steady and constant lubrication to machine parts which are to be lubricated, such as a bearing.

DESCRIPTION OF PRIOR ART

In the past, a grease gun has been used to lubricate machine parts. However, there are a number of disadvantages with the use of a grease gun because the user had to keep his/her mind on the proper timing and location of machine parts to be lubricated. Therefore, it has been requested to provide a lubricating apparatus which can function automatically.

Automatic lubricating apparatus is well known in the field of the art. For example, U.S. Pat. No. 4,023,648 describes a lubricating apparatus which employs the method of forcing the lubricant to a location to be lubricated by gas pressure. The gas is generated by a chemical reaction and acts against the diaphragm, stretching it to move a piston forcing the lubricant out of the grease chamber. However, since the stretch curve of such a diaphragm varies depending upon the external pressure and the amount of stretching, it is not reliable.

Illustrated in FIG. 1, U.S. Pat. No. 4,671,386 describes the embodiment of a lubricating apparatus comprised of a base member(30), a lubricant chamber(2) threadedly received within the lubricant chamber(2), an lubricant outlet(4), a gas generating device including numerous resistors, a switch means formed with a plurality of screws(32), a reaction chamber, an outlet for the reaction chamber, a bellows(44) responsive to the pressure to force lubricant from the chamber and an electronic circuit to compensate for variations in ambient pressure.

As one of the screws(32) threaded in the base member(30) is turned, it extends externally from the base member(30) so that its head makes contact with the printed circuit and introduces a resistor into the circuit. Then the battery current is conducted to the gas generating device and causes it to generate gas. As the gas is generated, it expands the bellows(44) which moves the piston(52) which forces grease from the lubricant chamber(2) through the outlet(4).

The principal difference between two prior patents is that, in order to ensure the consistency of lubrication, the diaphragm used in U.S. Pat. No. 4,023,648 has been substituted with the bellows used in U.S. Pat. No. 4,671,386. However, since the inner space of the bellows is relatively larger than the rate of gas generation, the bellows can not exert force upon the piston until it is substantially filled with the gas. Therefore, the lubrication initiation is inevitably delayed even if prompt lubrication is required. In other words, the lubrication does not start immediately at the stage of the installation. For example, if the apparatus is set to release grease on a monthly basis, it takes a week to start the initial lubrication and if on an yearly basis, it takes a month.

There are also gas leak problems which result because of an inappropriately attained seal of the bellows by clamping the flange of the bellows on the horizontal wall of the lubricant chamber and the sealing of the gas chamber only by an O-ring. Furthermore, since a plurality of screws and resistors are included so as to let the user select the period of lubrication, it can not be manufactured economically.

SUMMARY OF THE INVENTION

The present invention provides a lubricating apparatus comprising a container filled with lubricant, a slidable piston fitted within the container with several seal rings and having a notch as a safety means, a frame ultrasonically welded onto the container, a gas generating means fixed onto the frame to generate gas to develop the pressure, a cover ultrasonically welded upon the frame, an outlet for lubricant at the lower end of the container and a control circuit which supplies current to the gas generating means.

According to one aspect of the present invention, it dispenses with a requisite part of the prior art such as a diaphragm or bellows so that it is possible to use the apparatus regardless of the physical characteristics of those parts and reduces the manufacturing cost.

According to another aspect of the present invention, lubrication can be started immediately after the installation of the apparatus, so that operation initiation need not be delayed.

According to the other aspect of the present invention, the gas sealing method employs ultrasonic welding. In addition, the safety means also employs a notch formed on the upper side of the piston which may be fractured along the notch in case the gas pressure exceeds the designated limit.

The remaining features of the present invention will be detailed with reference to the accompanying drawings in which.

DETAILED DESCRIPTION OF THE PREFERRED EMBODIMENTS

Figure 1:
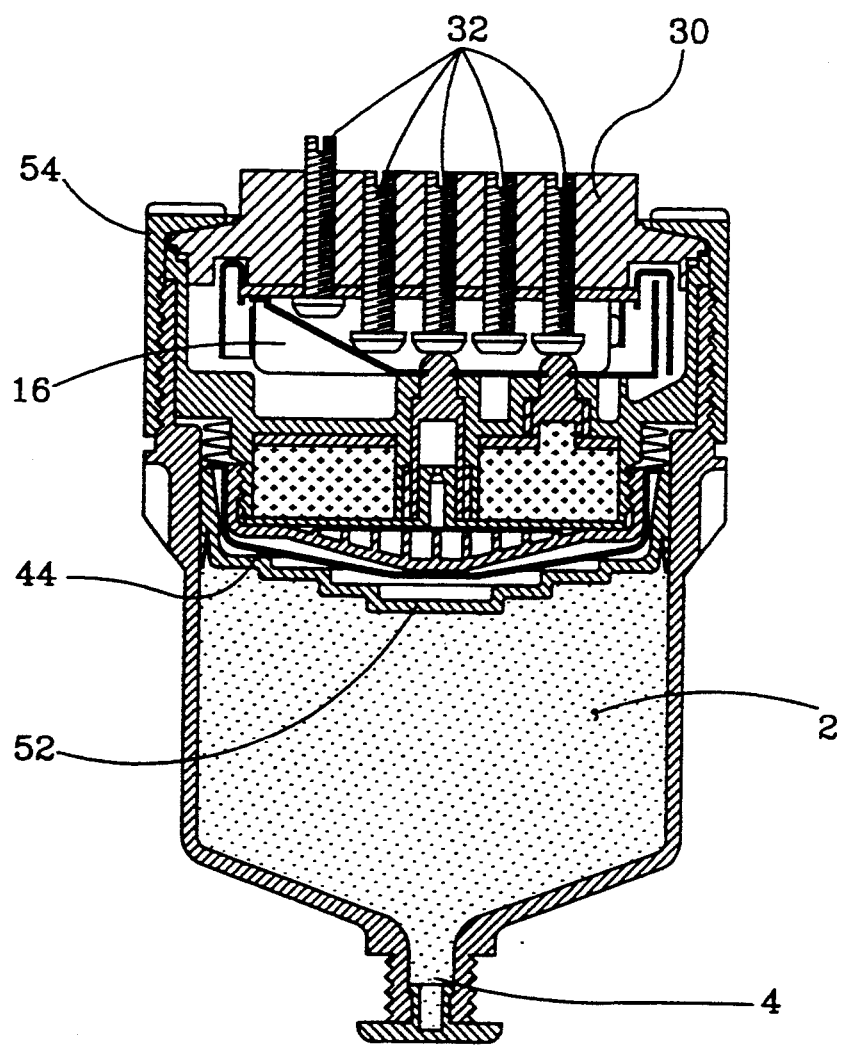
FIG. 1 is a cross-sectional view of the lubricating apparatus according to the prior art.
Figure 2:
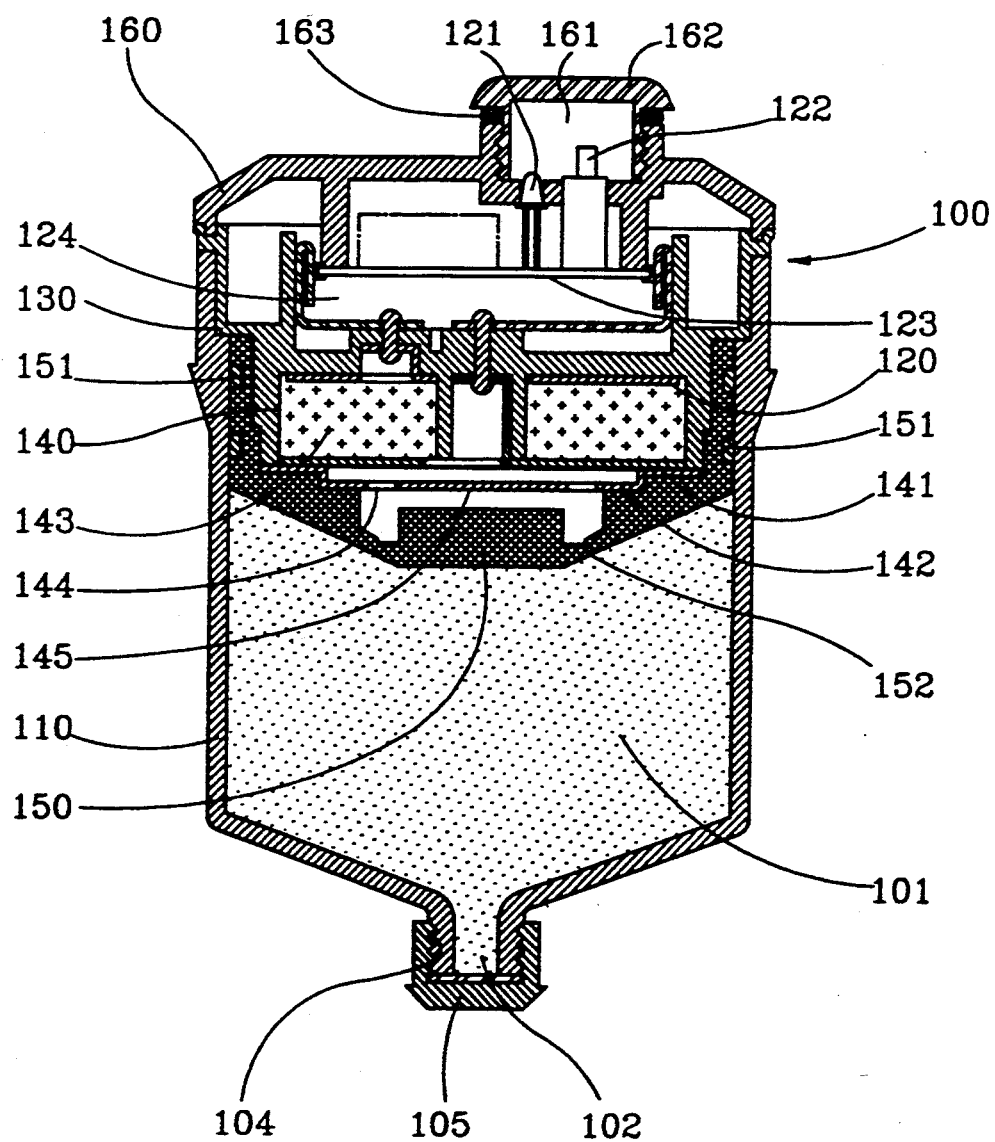
FIG. 2 is a cross-sectional view of the lubricating apparatus according to the present invention.
Figure 3:
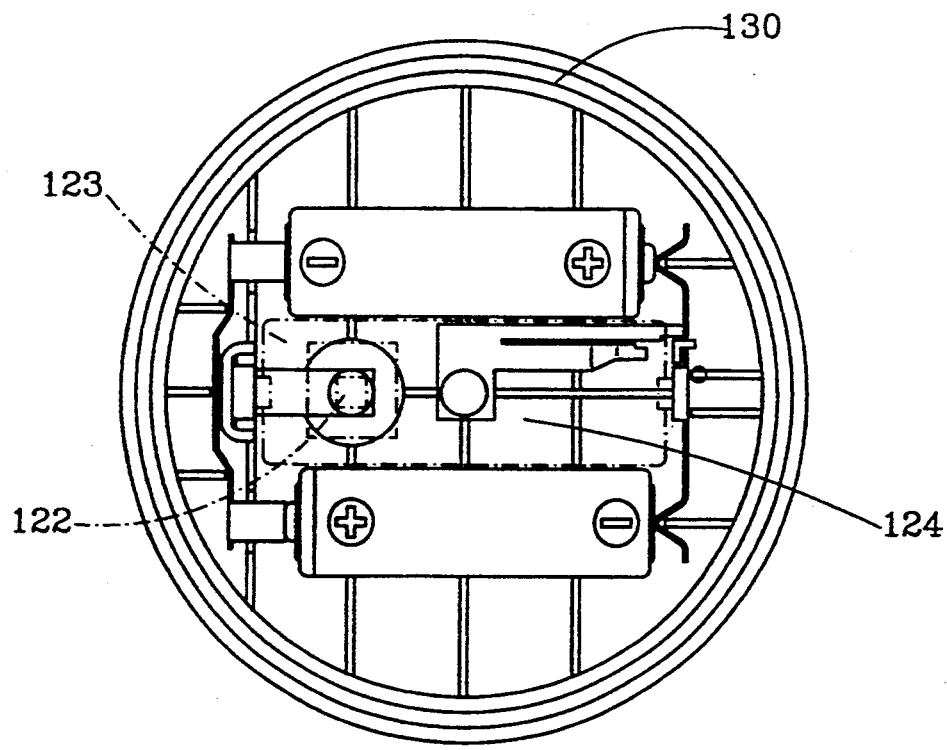
FIG. 3 is a top view of FIG. 2 with the cover removed.

Referring to FIG. 2, the lubricating apparatus(100) of the present invention comprises a container(110) filled with lubricant(101), a slidable piston(150) fitted within the container(110) with seal rings(151) having a notch(152) as a safety means, a frame(130) ultrasonically welded onto the container(110), a gas generating means(120) fixed onto the frame(130) to generate gas to develop the pressure, a cover(160) ultrasonically welded onto the frame(130), an outlet(102) for lubricant at the lower end of the container(110) and a control circuit for supplying the current to the gas generating means(120).

The container(110) is made of transparent plastic material so that it is possible to see the amount of the lubricant contained therein. Indicating scales(103) can help the user measure the amount of lubricant. At the lower end of the container(110), the lubricant outlet(102) has threads(104) on its outer surface so that it can be threaded into the inlet for lubricant formed in the bearing (See FIG. 5). While it is on the shelf, a threaded cap(105) covers the outlet(102).

The gas generating means(120) fixed onto the frame(130) includes a printed circuit board, PCB(123), a battery receiver(124) and a gas generating member(140).

Figure 4:
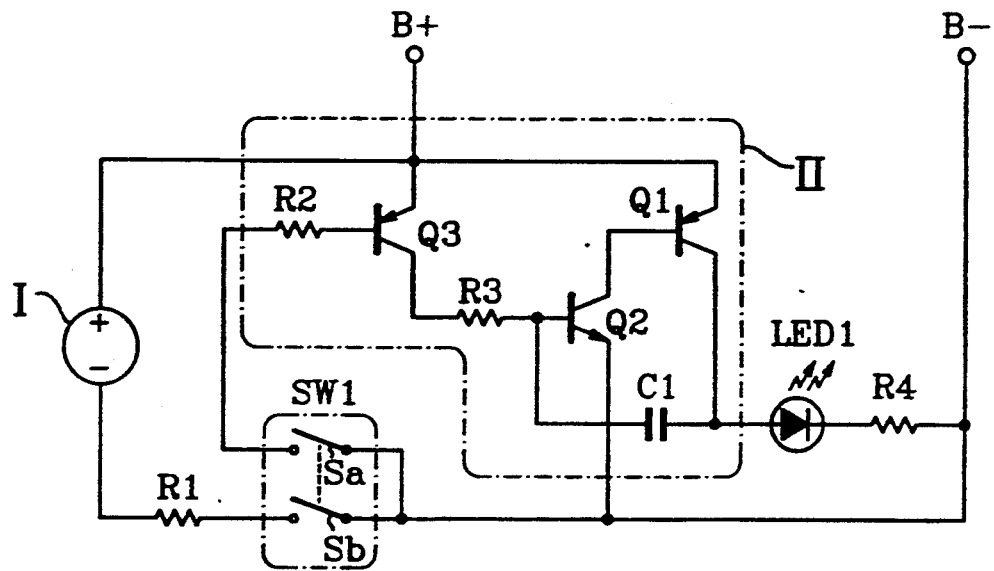
FIG. 4 is a diagram of the control circuit system according to the present invention.

Referring to FIG. 4 the control circuit of the apparatus comprises: an LED (light emitting diode, LED 1) which indicates the operation of the electro-chemical reactor (I); an LED driving section(II) for driving the LED (LED 1); and a switch (SW1) for switching the power supply to the reactor(I) and to the LED driving section (II). The LED driving section (II) is composed of Darlington-connected transistors (Q1 to Q3) which are controlled by the supply voltage (B−) inputted through the switch (SW1) and which supplies the voltage(B+) to the LED(LED1), bias resistors (R2 and R3) and a surge limiting capacitor(C1).

As to the operation of the control circuit, when the switch(SW1) is turned on, both contacts(Sa and Sb) of the switch (SW1) are closed. Accordingly, a driving current, the amount of which is determined by a resistor (R1), flows to the reactor(I) and thus the reactor(I) operates to generate gas. At the same time, the transistor(Q3) in the LED driving section(II) is base-biased by the supply voltage (B−) applied through the contact-(Sa) of the switch (SW1) and the resistor(R2) and thus turned ON. Accordingly, the transistors(Q2 and Q1) are also turned on sequentially (in order) and thus the supply voltage(B+) through the transistor(Q1) is fed to the LED(LED1), causing the LED(LED1) to be turned ON, visually indicating that the reactor(1) is operating.

Meanwhile, when the switch(SW1) is OFF, the power supply to the reactor(I) and the LED driving section(2) is cut-off, causing them not to operate, respectively. The skilled man in this field understands that the various embodiments of arrangements are already well known in the art.

The gas generating member(140) is impregnated with electrolytes (143) and electrically communicated with the control circuit by way of conducting pieces(141,142). The conducting pieces(141,142) are made of stainless steel and connected with the cathode and the anode of the battery received in the battery receiver(124). The gas generating member(140) impregnated with electrolytes(143) is located between the conducting pieces(141,142).

The under-cover(145) having pores(144) is mounted under the frame(130) so as to support the gas generating member(140) and allows the gas generated to flow through the pores(144).

The slidable piston(150) is fitted within the container(110) and provided with seal rings(151) in order to prevent gas from leaking. It is preferable, to select rings(151) of color which can be easily seen from outside of the transparent container(110).

A notch(152), acting as safety means, is provided on the upper side of the piston(150) facing the under-cover(145) in order to secure safe operation of the apparatus. In case the gas pressure, due to any reason, exceeds the designated limits, the piston(150) may be fractured along the notch(152) stopping the pressure force exerted on the lubricant.

When the piston is at the top dead center, the space defined between the bottom of the gas generating member(140) and upper side of the piston(150) is substantially small compared to the rate of gas generation. (In FIG. 2, the space is shown larger than actual size for clear illustration.) Therefore, once the circuit is closed and the gas generating means(140) starts to generate gas, the pressure force formed in the space can move the piston immediately.

The frame(130) is fixed and sealed onto the container(110) by ultrasonic welding. The cover(160) is also fixed and sealed onto the upper periphery of the frame(130) by Ultrasonic welding. The top of the cover(160) is provided with a switch room(161) in which the LED(121) and the push button switch(122) are enclosed. The removable transparent cap(162) is threaded into the switch room(161) with an O-ring(163) seal. When lubrication needs to be initiated or ceased, the user can open the cap(162) to turn the switch(122) on or off. As the cap is transparent, without opening the transparent cap(162), it is possible to see the LED(121) blinking.

Figure 5:
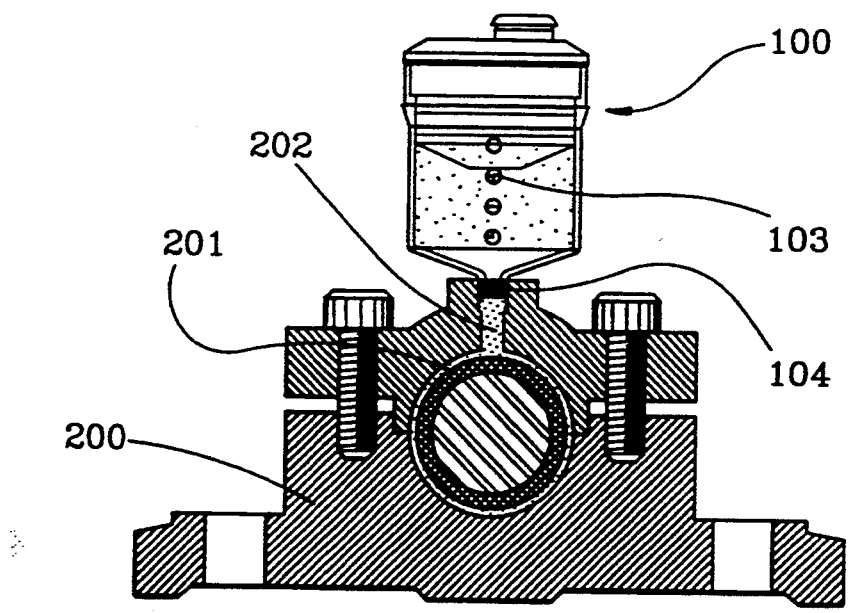
FIG. 5 illustrates the lubricating apparatus installed on the bearing.

In using the apparatus, after separating the cap(105) from the outlet(102) of the container(110), threads(104) are engaged with the threads of the inlet of the bearing(200), thereby it is fixed on the bearing to be lubricated as shown in FIG. 5.

As the user opens the cap(5) and turns the switch(122) on, the circuit is closed and the electrical currents from the battery flow into the conducting pieces(141,142) with the blinking LED(121). As the currents flow into the conducting pieces(141,142), the electrolytes(143) contained in the member(140) start the chemical reaction which produces the gas according to the composition of the electrolytes. The generated gas flows through the pores(144) into the space defined between the frame(130) and the piston(150), thereby exerting pressure force on the piston to move it downward. As the piston moves, lubricant contained in the container(110) flows steadily and continuously out through the outlet(102) until the circuit is opened or the lubricant is exhausted.

I claim:

1. A lubricating apparatus comprising:
   a transparent container filled with lubricant;
   a slidable piston fitted within the container;
   a frame ultrasonically welded onto the container;
   a gas generating means fixed onto the frame to generate gas to develop pressure, and including a switch and a gas generating member impregnated with electrolytes;
   a cover welded onto the frame;
   an outlet for lubricant at a lower end of the container; and
   a control circuit for supplying current to the gas generating means;
   wherein a space defined between a bottom of the gas generating member and an upper side of the piston at the top dead center is substantially small compared to a rate of gas generation, whereby the pressure forced formed in the space can move the piston to let the lubricant flow out through the outlet without delay; and
   wherein the piston is provided with seal rings preventing gas leakage and also with a notch as a safety means which may be fractured in case the gas pressure exceeds a designated limit, a color of the seal rings being visible through the transparent container.

2. A lubricating apparatus as claimed in claim 1, wherein the frame is fixed and sealed onto the container by ultrasonic welding.

3. A lubricating apparatus as claimed in claim 1, wherein the cover is fixed and sealed onto an upper periphery of the frame by ultrasonic welding and provided with a switch room including a push button switch and LED.

4. A lubricating apparatus as claimed in claim 3, wherein a removable transparent cap is threaded into the switch room with an O-ring seal.

5. A lubricating apparatus comprising:
- a transparent container filled with lubricant;
- a slidable piston fitted within the container;
- a frame welded onto the container;
- a gas generating means fixed onto the frame to generate gas to develop pressure and including a switch and a gas generating member impregnated with electrolytes;
- a cover welded onto the frame;
- an outlet for lubricant at a lower end of the container; and
- a control circuit for supplying current to the gas generating means;
- wherein a space defined between a bottom of the gas generating member and an upper side of the piston at top dead center is substantially small compared to a rate of gas generation, whereby the pressure force formed in the space can move the piston to let the lubricant flow out through the outlet without delay; and
- wherein the piston is provided with seal rings preventing gas leakage and also with a notch as a safety means which may be fractured in case the gas pressure exceeds a designated limit, a color of the seal rings being visible through the transparent container.

* * * * *